United States Patent
Philpott et al.

(10) Patent No.: US 6,268,972 B1
(45) Date of Patent: Jul. 31, 2001

(54) METHOD FOR MEASURING RELATIVE AND ABSOLUTE AMPLITUDES OF A SIGNAL READ FROM A DATA STORAGE MEDIUM

(75) Inventors: Rick Allen Philpott, Rochester, MN (US); Gregory Scott Winn, Fort Collins, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/157,226

(22) Filed: Sep. 18, 1998

(51) Int. Cl.[7] ........................................................ G11B 5/09
(52) U.S. Cl. ...................................... 360/46; 360/67
(58) Field of Search .................... 360/46, 67, 53

(56) References Cited

U.S. PATENT DOCUMENTS

| | | |
|---|---|---|
| 5,162,678 | 11/1992 | Yamasaki . |
| 5,321,559 | 6/1994 | Nguyen et al. . |
| 5,463,603 | 10/1995 | Petersen . |
| 5,491,447 | 2/1996 | Goetschel et al. . |
| 5,519,548 | * 5/1996 | Liepe et al. .............................. 360/46 |
| 5,572,163 | 11/1996 | Kimura et al. . |
| 5,631,891 | 5/1997 | Moritsugu et al. . |
| 5,831,781 | * 11/1998 | Okamura ................................ 360/67 |

FOREIGN PATENT DOCUMENTS 0 521 653 A2   7/1993   (EP) .

* cited by examiner

*Primary Examiner*—Alan T. Faber
(74) *Attorney, Agent, or Firm*—Mark A. Hollingsworth

(57) ABSTRACT

A method for measuring an amplitude of a readback signal obtained from a data storage medium involves transmitting the readback signal to a gain modifying amplifier, such as a variable gain amplifier (VGA), preferably provided in the read channel. A voltage signal associated with a loop gain of the amplification circuitry is sensed and compared with a number of control voltage signals, each of the control voltage signals being associated with a corresponding digital word value. The digital word value associated with a control voltage signal that is equal to the sensed voltage signal represents the relative amplitude of the readback signal. Gain characterization circuitry may further be combined with readback signal amplitude measuring circuitry, preferably in-situ a read channel, to obtain the absolute amplitude of a readback signal. Gain characteristics of the amplification circuitry are determined by applying reference voltage signals associated with corresponding pre-established gain values to the signal input of the gain modifying amplifier. A control voltage signal is selectively applied to the amplifier for each of the reference voltage signals until the amplifier output voltage signal is substantially equal to a pre-established reference voltage signal. Amplitude measurements may thereafter be taken to obtain the absolute amplitude of readback signals. Readback signal amplitude measurements may be performed when the read channel is in a read mode, idle mode, or servo mode of operation.

20 Claims, 16 Drawing Sheets

METHOD FOR MEASURING RELATIVE AND ABSOLUTE AMPLITUDES OF A SIGNAL READ FROM A DATA STORAGE MEDIUM

FIELD OF THE INVENTION

The present invention relates generally to signals read from a data storage medium and, more particularly, to a system and method for measuring relative and absolute amplitudes of a signal read from a data storage medium provided in a disk drive system.

BACKGROUND OF THE INVENTION

A typical disk drive system includes a magnetic medium for storing data in magnetic form and a number of transducers used to write and read magnetic data respectively to and from the medium. A typical disk storage device, for example, includes one or more data storage disks coaxially mounted on a hub of a spindle motor. The spindle motor rotates the disks at speeds typically on the order of several thousand revolutions-per-minute (RPM).

Digital information is typically stored in the form of magnetic transitions on a series of concentric, spaced tracks formatted on the surface of the magnetizable rigid data storage disks. The tracks are generally divided into a number of sectors, with each sector comprising a number of information fields, including fields for storing data, and sector identification and synchronization information, for example.

An actuator assembly typically includes a plurality of outwardly extending arms with one or more read/write head assemblies being mounted thereon by use of flexible suspensions. A typical read/write head assembly is understood to include a slider body, a read element, and a write element. The slider body lifts the read/write elements off the surface of the disk as the rate of spindle motor rotation increases, and causes the read/write elements to hover above the disk on an air bearing produced by high speed disk rotation. The distance between a read/write head and the disk surface, which is typically on the order of 40–100 nanometers (nm), is commonly referred to as head-to-disk clearance or spacing.

Writing data to a magnetic data storage disk generally involves passing a current through a write element of the read/write head assembly to produce magnetic lines of flux which magnetize a specific location of the disk surface. Reading data from a specified disk location is typically accomplished by a read element of the read/write head assembly sensing the magnetic field or flux lines emanating from the magnetized locations of the disk. As the read element passes over the rotating disk surface, the interaction between the read element and the magnetized locations on the disk surface results in the production of electrical signals, commonly referred to as readback signals, in the read element.

Conventional disk drive systems generally employ a closed-loop servo control system for positioning the read/write elements, or transducers, to specified storage locations on the data storage disk. During normal disk drive system operation, a servo transducer, generally mounted proximate the read/write transducers, or, alternatively, incorporated as the read element of the read/write head assembly, is typically employed to read information for the purpose of following a specified track (i.e., track following) and locating (i.e., seeking) specified track and data sector locations on the disk.

In accordance with one known servo technique, embedded servo pattern information is written to the disk along segments extending in a direction generally outward from the center of the disk. The embedded servo patterns are thus formed between the data storing sectors of each track. It is noted that a servo sector typically contains a pattern of data, often termed a servo burst pattern, used to maintain optimum alignment of the read/write transducers over the centerline of a track when transferring data to and from specified data sectors on the track. The servo information may also include sector and track identification codes which are used to identify the location of the transducer.

Within the disk drive system manufacturing industry, much attention is presently being focused on the performance and reliability of the transducers utilized as part of the read/write head. Changes in the operating characteristics of a read transducer, for example, may be indicative of read/write head degradation or impending failure of the head. Changes in the amplitude of a readback signal, for example, may indicate a possible problem with the read element.

Magnetoresistive (MR) elements, also referred to as MR stripes, are being used as read transducers in many disk drive systems. Although an MR read/write head assembly, typically incorporating an MR read element and a thin-film write element, would appear to provide a number of advantages over conventional thin-film heads and the like, it is known by those skilled in the art that MR transducers often exhibit undesirable behavior that is difficult to detect, suppress or quantify.

It has been found, for example, that the amplitude characteristics of a readback signal may provide insight as to the integrity and operating condition of a read transducer. A giant MR (GMR) transducer that is operating in an anomalous manner, by way of example, may produce readback signals of decreasing amplitude over time. The nature and complexity of most read channel designs, however, generally preclude in-situ determination of readback signal characteristics, such as determining readback signal amplitude over time.

There exists a keenly felt need in the disk drive system manufacturing community for an apparatus and method for determining the amplitude of a readback signal obtained from a data storage medium. There exists a particular need for such an apparatus and method that may be implemented in-situ a read channel, and without provision of components and test equipment external to the disk drive system. The present invention fulfills these and other needs.

SUMMARY OF THE INVENTION

The present invention is directed to an apparatus and method of measuring an amplitude of a readback signal obtained from a data storage medium. Measuring the relative amplitude of a readback signal involves transmitting the readback signal to a gain modifying amplifier, such as a variable gain amplifier (VGA), preferably provided in the read channel. A voltage signal associated with a loop gain of the amplification circuitry is sensed.

The sensed voltage signal is compared with a number of control voltage signals, each of which is associated with a digital word value, until the sensed voltage signal is substantially equal to a selected control voltage signal. The digital word value associated with the last used control voltage signal represents the relative amplitude of the readback signal. The readback signal amplitude measurement may be performed when the read channel is in a read mode, idle mode, or servo mode of operation.

The absolute amplitude of a readback signal may be determined by taking a readback signal amplitude measurement after performing a gain characterization procedure. Determining the gain characteristics of the amplification circuit involves applying each of a number of reference voltage signals to the signal input of the gain modifying amplifier. Each of the reference voltage signals is associated with a corresponding pre-established gain value. For each of the reference voltage signals applied to the amplifier, a control voltage signal is selectively applied to the amplifier until the amplifier output voltage signal is substantially equal to a pre-established reference voltage signal. Following completion of the gain characterization procedure, any number of amplitude measurements may be taken to obtain the absolute amplitude of the readback signals.

An embodiment of a circuit for measuring an amplitude of a readback signal includes a gain modifying amplifier that receives the readback signal. A multiplexer includes a control voltage signal output coupled to the amplifier and a sense output. A sense voltage signal associated with a gain of the amplifier is developed at the sense output of the multiplexer. The circuit further includes a digital-to-analog converter (DAC) having an output and an input. A control circuit, coupled to the input of the DAC, transmits to the DAC a digital word value representative of a control voltage signal. The DAC transmits the control voltage signal to a comparator.

The comparator, having a first input coupled to the sense output of the multiplexer, a second input coupled to the output of the DAC, and an output, compares the sense voltage signal developed at the first input with the control voltage signal developed at the second input. The control circuit transmits digital word values to the DAC until the control voltage signal is substantially equal to the sensed voltage signal, at which point the digital word associated with a control voltage signal represents a relative amplitude of the readback signal.

An embodiment of circuitry for determining the gain characteristics of a readback signal amplitude measuring circuit includes a buffer coupled to a gain modifying amplifier, such as a variable gain amplifier. The variable gain amplifier includes an input for receiving the readback signal, an output, and a control input. The buffer includes an input/output (I/O) interface and an output coupled to the control input of the amplifier. The circuitry further includes a comparator having a first input coupled to the output of the amplifier, a second input coupled to a first reference voltage source that produces a reference voltage of a predetermined amplitude, and an output. A DAC includes an output coupled to the I/O interface of the buffer.

A control circuit is coupled to the input of the DAC and the output of the comparator. The control circuit communicates a number of digital words to the DAC for purposes of determining amplifier gain characteristics. Each of the digital words is associated with a preestablished gain value and a control voltage. The comparator compares the output signal produced by the amplifier with the reference voltage, and the control circuit transmits digital words to the DAC until the amplifier output signal is substantially equal to the predetermined reference voltage amplitude.

The gain characterization circuitry may further include a memory coupled to the control circuit for storing the digital words and associated preestablished gain values and control voltages. A second reference voltage source may also be coupled to the input of the amplifier. The second reference voltage source supplies a selected one of a number of reference voltage signals to the amplifier for purposes of determining amplifier gain characteristics. Each of the reference voltage signals is associated with a preestablished gain value.

Gain characterization circuitry may further be combined with readback signal amplitude measuring circuitry, preferably in-situ a read channel. In such an embodiment, a gain characterization procedure is performed prior to taking absolute readback signal amplitude measurements.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
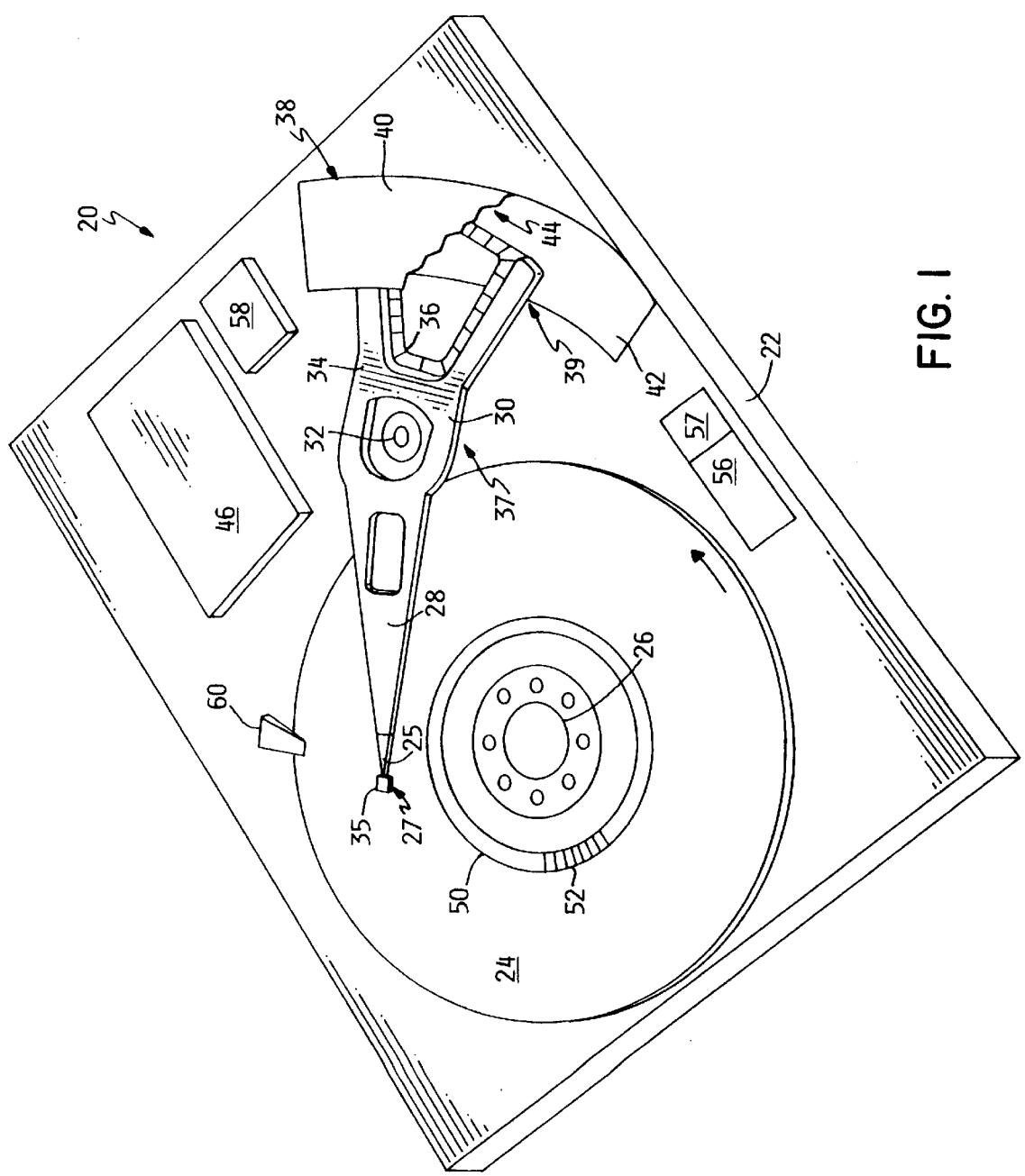
FIG. 1 is a top perspective view of a disk drive system with its upper housing cover removed.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

A system and methodology in accordance with the principles of the present invention provide for the measurement of the relative amplitude of a readback signal obtained from a data storage medium. Another embodiment of the present invention provides for the measurement of the absolute amplitude of a readback signal obtained from a data storage medium. Obtaining an absolute amplitude measurement of a readback signal is achieved by characterizing the gain of amplification circuitry provided in the read channel. The readback amplitude measurement and gain characterization methodologies of the present invention may be advantageously implemented within the read channel electronics, thereby eliminating dependency on external signal processing electronics.

A significant increase in amplitude measurement accuracy is realized through amplitude measurement and gain characterization circuitry fully-integrated within the read channel. As such, amplitude measurement inaccuracies resulting from temperature variations and process shifts, for example, that would otherwise result when using electronics external to the read channel are altogether obviated through employment of an integrated approach in accordance with the principles of the present invention.

Figure 2:
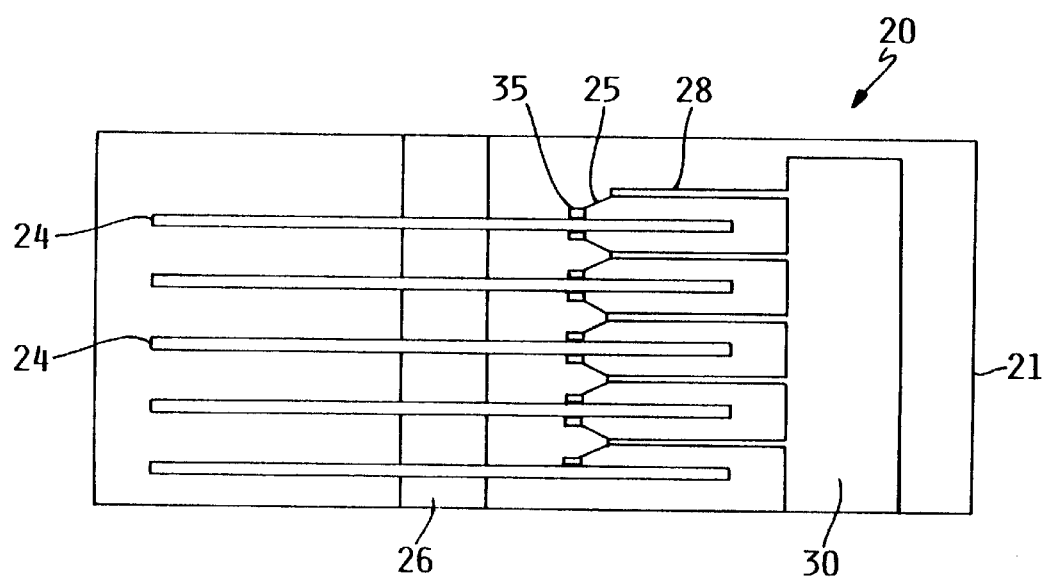
FIG. 2 is a side plan view of a disk drive system comprising a plurality of data storage disks.

Referring to the drawings, and more particularly to FIGS. 1 and 2, there is illustrated a disk drive system 20 within which the readback signal amplitude and gain characterization methodology of the present invention may be implemented. The disk drive system 20, as is best shown in FIG. 2, typically includes one or more rigid data storage disks 24 which are stacked coaxially in a tandem spaced relationship, and rotate about a spindle motor 26 at a relatively high rate of rotation. As is depicted in FIG. 1, each disk 24 is typically formatted to include a plurality of spaced concentric tracks 50, with each track being partitioned into a series of sectors 52 which, in turn, are further divided into individual information fields. One or more of the disks 24 may alternatively be formatted to include a spiraled track configuration.

An actuator 30 typically includes a number of interleaved actuator arms 28 with each arm having one or more transducer 27 and slider assemblies 35 mounted to a load beam 25 for transferring information to and from the data storage disks 24. The slider 35 is typically designed as an aerodynamic lifting body that lifts the transducer 27 off the surface of the disk 24 as the rate of spindle motor rotation increases and causes the transducer 27 to hover above the disk 24 on an air bearing produced by high speed of rotation of the disk 24. A conformal lubricant may alternatively be disposed on the disk surface 24 to reduce static and dynamic friction between the slider 35 and the disk surface 24.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a polyphase AC motor or, alternatively, a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

The servo processor 56, which cooperates with read channel electronics 57, regulates the actuator voice coil motor 39 to move the actuator arms 28 and transducers 27 to prescribed track 50 and sector 52 locations when reading and writing data to and from the disks 24. The servo processor 56 is loosely coupled to a disk drive controller 58. The disk drive controller 58 typically includes control circuitry and software that coordinate the transfer of data to and from the data storage disks 24. Although the servo processor 56 and disk drive controller 58 are depicted as two separate devices in FIG. 1, it is understood that the functionality of the servo processor 56 and disk drive controller 58 may be embodied in a single multi-purpose processor, which typically results in a reduced component cost.

Figure 3A:
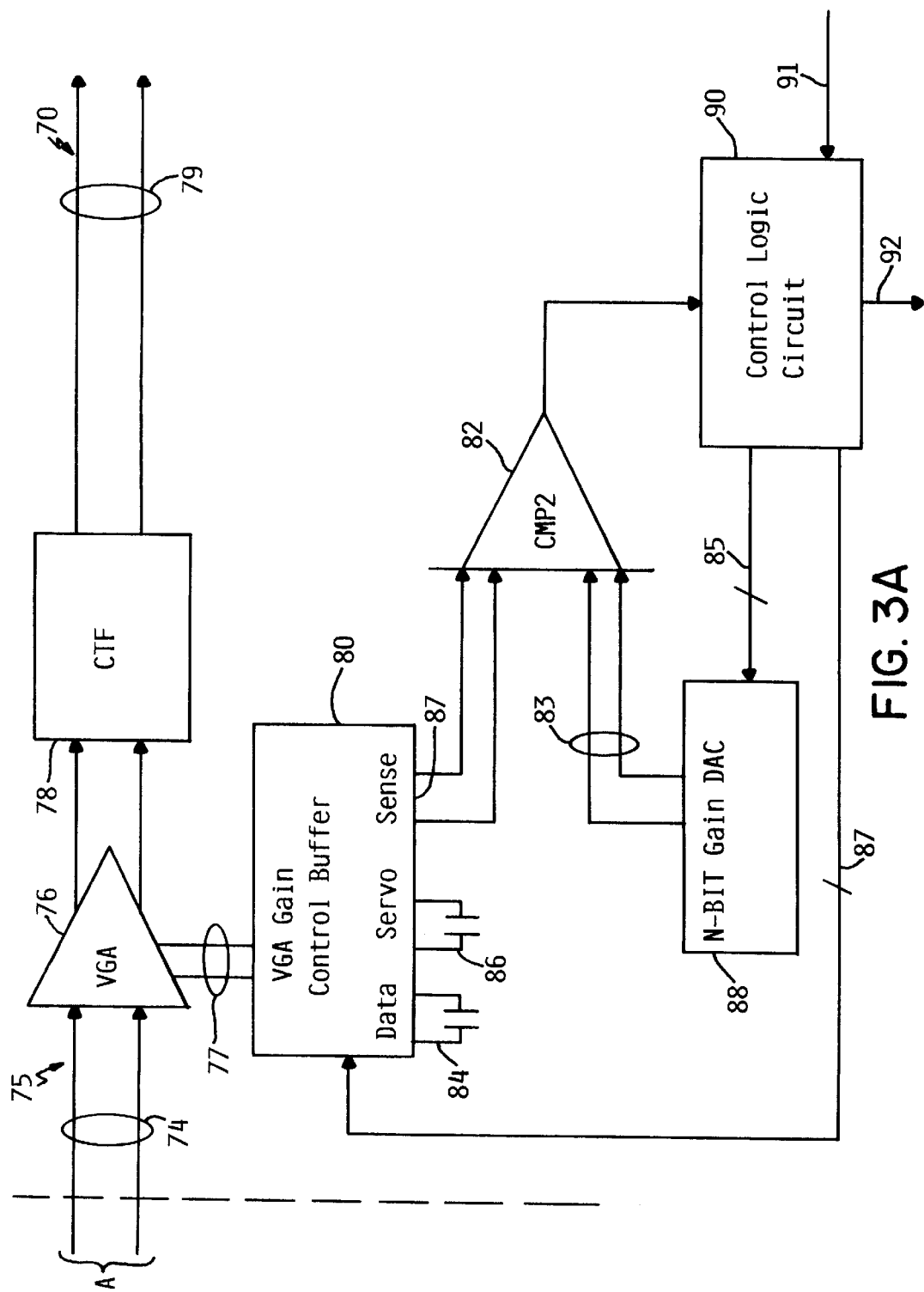
FIG. 3 is a block diagram of read channel circuitry including circuitry for taking a relative readback signal amplitude measurement in accordance with an embodiment of the present invention.
Figure 3B:
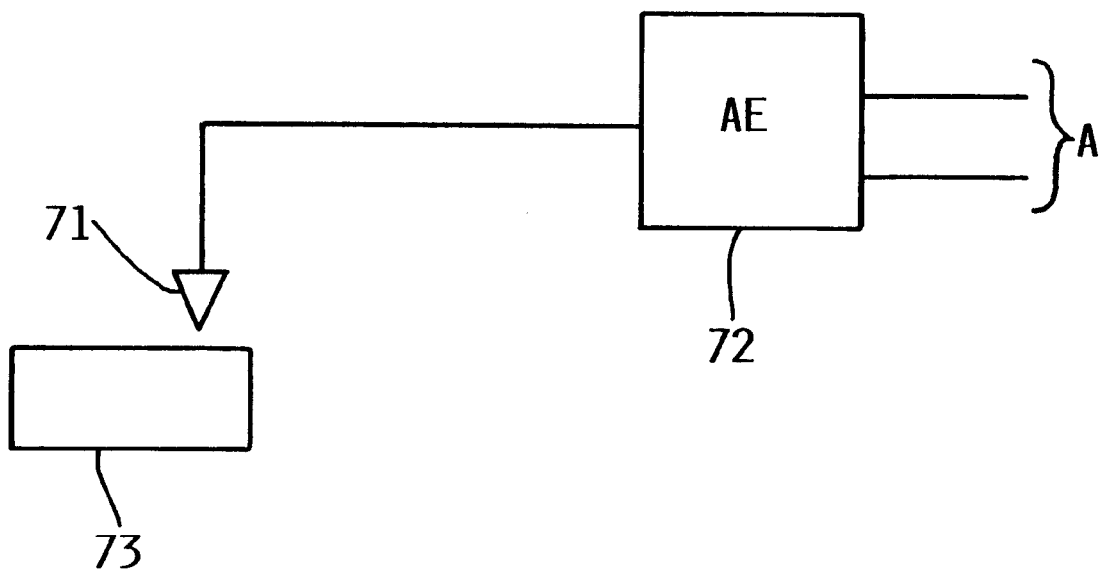

Turning now to FIG. 3, there is illustrated an embodiment of amplitude measurement circuitry for measuring the relative amplitude of a readback signal obtained from a data storage medium. The circuitry illustrated in FIG. 3 may be integrated within the read channel electronics of the system described previously with respect to FIGS. 1 and 2. It is understood that the amplitude measurement circuitry shown in FIG. 3, as well as other circuit embodiments and amplitude measurement and gain characterization methodologies described herein, may be implemented in a wide variety of disk drive systems and data storing systems in general.

FIG. 3 depicts a number of components that process information signals derived from a data storage disk 73 using the read element of a read/write head 71. The information signals obtained from the surface of disk 73 typically represent data or servo information stored thereon, but may include other types of information. The information stored on disk 73 is typically in the form of magnetic transitions on a series of concentric or serpentine tracks. The read/write head may include a magnetoresistive (MR) read element, a giant magnetoresistive (GMR) read element, a thin-film read element, or other type of read transducer. It is understood that data storage disk 73 may store optical information, and that read/write head 71 may include an optical read element.

The information signal induced in the read transducer of read/write head 71 is typically communicated to pre-amplification electronics, such as an arm electronics (AE) circuit or module 72. The AE module 72 amplifies the readback signal transmitted from the read/write head 71, typically from the microvolt range to the millivolt range. The amplified readback signal is communicated from the AE module 72 to a readback amplitude measuring circuit 75. The readback amplitude measuring circuit 75 is preferably, but not necessarily, integrated within the read channel. It is noted that various components of the readback amplitude measuring circuit 75 are components typically employed in read channel applications. Such components may be coupled to other circuit elements which, in combination, provide for relative readback signal amplitude measurements in accordance with the principles of the present invention.

In accordance with the embodiment illustrated in FIG. 3, the readback signal amplitude measuring circuitry 75 includes a variable gain amplifier (VGA) 76 which is coupled to the AE module 72 through one or more signal conductors 74. A variable gain amplifier is understood in the art as an amplifier having a gain that is alterable in response to control signals, such as voltage control signals. The VGA 76 is coupled to a continuous time filter (CTF) 78 through which readback signals are communicated and filtered. Readback signals output from CTF 78 are transmitted to downstream circuitry along one or more signal conductors 79.

In a preferred embodiment, VGA 76 is used to normalize the amplitude of the readback signal received from AE module 72. For example, the readback signal amplitude at the output of VGA 76 may be normalized at 800 mV$_{dpp}$ (peak-to-peak). In an embodiment that includes both VGA 76 and CTF 78, the normalized amplitude of interest is that associated with the combination of VGA 76 and CTF 78.

In accordance with the circuit configuration shown in FIG. 3, a VGA gain control buffer 80 produces control voltage signals which are transmitted along one or more conductors 77 to VGA 76 for purposes of adjusting the gain of VGA 76. The gain control buffer 80 includes a data gain capacitor 84 and a servo gain capacitor 86. The voltages developed respectively across gain capacitors 84, 86 are representative of integrated automatic gain control voltages that are not directly reflective of readback signal amplitude. It will be appreciated that gain control buffer 80 may, in a less complex embodiment, be representative of a multiplexer.

A sense output 87 of the gain control buffer 80 provides a sense output voltage equivalent to that developed across either one of the data or servo gain capacitors 84, 86. During either an idle mode or read mode of operation, an output voltage equivalent to that developed across data gain capacitor 84 is provided at the sense output 87 of the gain control buffer 80. During a servo mode of operation, the sense output voltage is equivalent to that developed across servo gain capacitor 86. As such, the gain control buffer 80 may select between data and servo gain capacitors 84, 86 depending on the operational state of the read channel.

The sense voltage provided at the sense output 87 of the gain control buffer 80 is communicated to an input of a comparator 82. An N-bit gain digital-to-analog converter (DAC) 88 is coupled to a second input of the comparator 82. The comparator 82 compares the sense voltage received from the gain control buffer 80 with a control voltage produced by gain DAC 88. An output of the comparator 82 is coupled to a control logic circuit 90. The comparator 82 generates a "1" (high) or "0" (low) output logic signal depending on the magnitude of the sense and control voltages applied to its respective inputs.

In response to non-equivalency between the sense voltage and control voltage applied to the respective inputs of comparator 82, the control logic circuit 92 transmits a digital word to gain DAC 88 over conductor 85. Gain DAC 88, in response to digital words received from the control logic circuit 90, produces associated control voltages which are transmitted to the comparator 82 for further comparison with the sense voltage produced by the gain control buffer 80. In response to equivalency between the sense voltage and a control voltage transmitted by gain DAC 88, the output of comparator 82 switches logic states.

The control logic circuit 90, in response to a logic state transition occurring at the output of comparator 82, termi-nates transmission of digital words to gain DAC 88. The most recently transmitted digital word that resulted in equivalency between the sense and control voltages is representative of the voltage at the sense output 87 of the gain control buffer 80, and thus the capacitor voltage developed across a selected one of the data or servo gain capacitors 84, 86. The digital word representative of the gain capacitor control voltage is associated with a corresponding relative readback signal amplitude, which may be provided at an output 92 of the control logic circuit 90.

Figure 4:
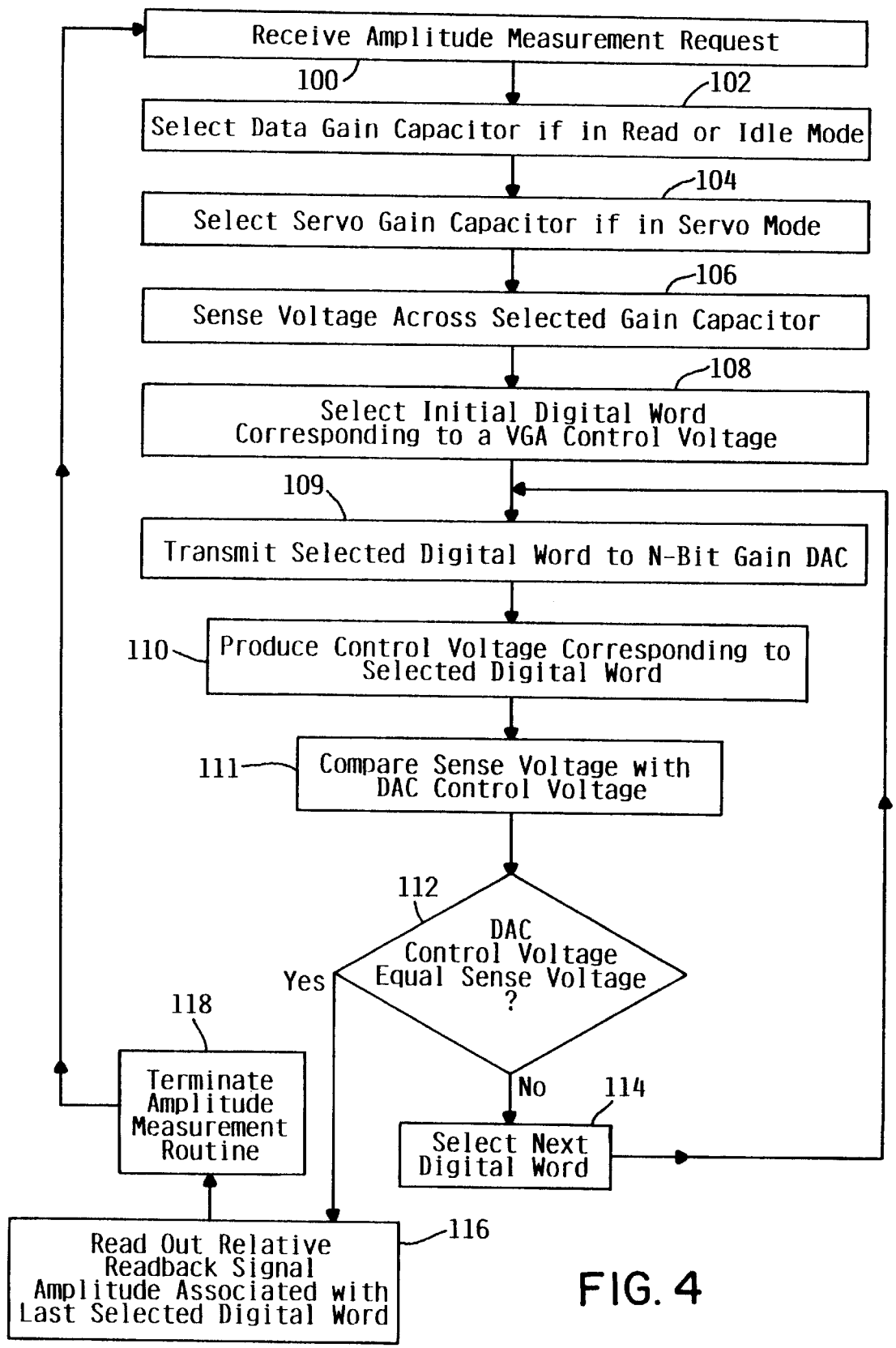
FIG. 4 illustrates in flow diagram form various steps associated with a methodology for taking a relative readback signal amplitude measurement according to the present invention.

Additional details concerning a procedure for measuring the relative amplitude of a readback signal using the circuitry depicted in FIG. 3 is provided with further reference to FIG. 4. A readback signal amplitude measurement procedure is initiated upon receiving 100 a request, typically from the disk drive controller. As was previously mentioned, an amplitude measurement may be taken during any operational mode of the disk drive system. If the amplitude measurement is to be taken during either a read mode or idle mode, the data gain capacitor 84 is selected 102. If the amplitude measurement is to be taken during a servo mode, the servo gain capacitor is selected 104.

A voltage equivalent to that developed across the selected gain capacitor is provided at the sense output 87 of the gain control buffer 80. The sense voltage corresponding to that of the selected gain capacitor is sensed 106 by comparator 82. The control logic circuit 90 selects an initial digital word which corresponds to an output or control voltage associated with gain DAC 88. The digital word is transmitted 109 to gain DAC 88. Gain DAC 88 produces 110 a control voltage at its output in response to the digital word received from control logic circuit 90. Comparator 82 compares the sense voltage received from gain control buffer 80 with the control voltage received from gain DAC 88.

If the gain DAC control voltage is not equal to the sense voltage 112, control logic circuit 90 selects 114 another digital word. Control logic circuit 90 may use a sequential, successive approximation, or other method when selecting the next digital word to be used. The next digital word is transmitted to gain DAC 88, thereby adjusting the control voltage transmitted to comparator 82. This comparison process continues until the gain DAC control voltage 83 is equivalent to the sense voltage provided at the sense output 87 of gain control buffer 80.

In response to equivalency between the sense and control voltages, the relative readback signal amplitude associated with the last selected digital word is read out 116 of control logic circuit 90 and provided at an output 92. The amplitude measurement routine is thereafter terminated 118, but may be reinitiated upon receiving a subsequent amplitude measurement request 100.

Control logic circuit 90, in accordance with one embodiment of the present invention, associates a number of N-bit digital words with a corresponding number of relative readback signal amplitude values. Associated with each of the N-bit digital words is various information, such as a control voltage which is produced at the output of gain DAC 88. Other information associated with each N-bit digital word includes relative amplitude signal data and a VGA gain value. Table 1 provided below represents simulated data values generated for a number of N-bit digital words of the type producable by control logic circuit 90. It is understood that the data provided in Table 1 below is illustrative of the type of data that may be used to facilitate the measurement of readback signal amplitude values.

TABLE 1

| Control Voltage | 8-Bit Digital Word | | VGA Gain | VGA Gain | Relative Readback Signal |
|---|---|---|---|---|---|
| | Hex | Decimal | (V/V) | (dB) | Amplitude |
| −400 mV | 00h | 0 | 0.8 | −2.5 | 1060 mV |
| −350 mV | 0Fh | 15 | 1.2 | 1.5 | 670 mV |
| −300 mV | 1Fh | 31 | 1.9 | 5.6 | 420 mV |
| −250 mV | 2Fh | 47 | 3.1 | 9.7 | 262 mV |
| −200 mV | 3Fh | 63 | 4.8 | 13.7 | 165 mV |
| −150 mV | 4Fh | 79 | 7.6 | 17.6 | 105 mV |
| −100 mV | 5Fh | 95 | 11.5 | 21.2 | 70 mV |
| −50 mV | 6Fh | 111 | 16.8 | 24.5 | 48 mV |
| 0 mV | 7Fh | 127 | 23.4 | 27.4 | 34 mV |
| 50 mV | 8Fh | 143 | 30.9 | 29.8 | 26 mV |
| 100 mV | 9Fh | 159 | 38.9 | 31.8 | 21 mV |
| 150 mV | AFh | 175 | 46.2 | 33.3 | 17.3 mV |
| 200 mV | BFh | 191 | 53.1 | 34.5 | 15.1 mV |
| 250 mV | CFh | 207 | 58.9 | 35.4 | 13.6 mV |
| 300 mV | DFh | 223 | 62.4 | 35.9 | 12.8 mV |
| 350 mV | EFh | 239 | 65.3 | 36.3 | 12.2 mV |
| 400 mV | FFh | 255 | 67.6 | 36.6 | 11.8 mV |

The range of amplifier control voltages, such as those shown in Table 1, typically span the range of expected voltage signals input to VGA 76. Table 1 above depicts control voltages ranging between −400 mV to +400 mV, which corresponds to an operating gain range of the VGA that permits normalization of the readback signal to 800 mV$_{pp}$ (peak-to-peak). Table 1 further illustrates use of an 8-bit digital word which provides for control voltage resolution in 3 mV increments (i.e., least significant bit (LSB)=3 mV).

Associated with each 8-bit digital word is a relative readback signal amplitude value. This value is reflective of an amplified readback signal amplitude processed by the AE module 72 or other preamplifier. The relative readback signal amplitude values depicted in Table 1 may be developed from simulation of a particular read channel design or through empirical evaluation of a particular read channel implementation.

The circuitry and methodology described above with reference to FIGS. 3–4 and Table 1 provide for the measurement of the relative amplitude of a readback signal input to VGA 76, or, in other words, output from the AE module 72 or other preamplifier receiving the readback signal from the read/write head 71. As was previously discussed, relative readback signal amplitude measurements are useful in identifying changes in the amplitude characteristics of an associated read transducer and/or read channel circuitry. By way of example, amplitude measurements which result in reduced amplitude values associated with a GMR read transducer are typically indicative of impending failure of the transducer. Such losses or deviations in relative readback signal amplitude may be used as part of a predictive failure analysis strategy for read transducers of varying types.

Figure 5:
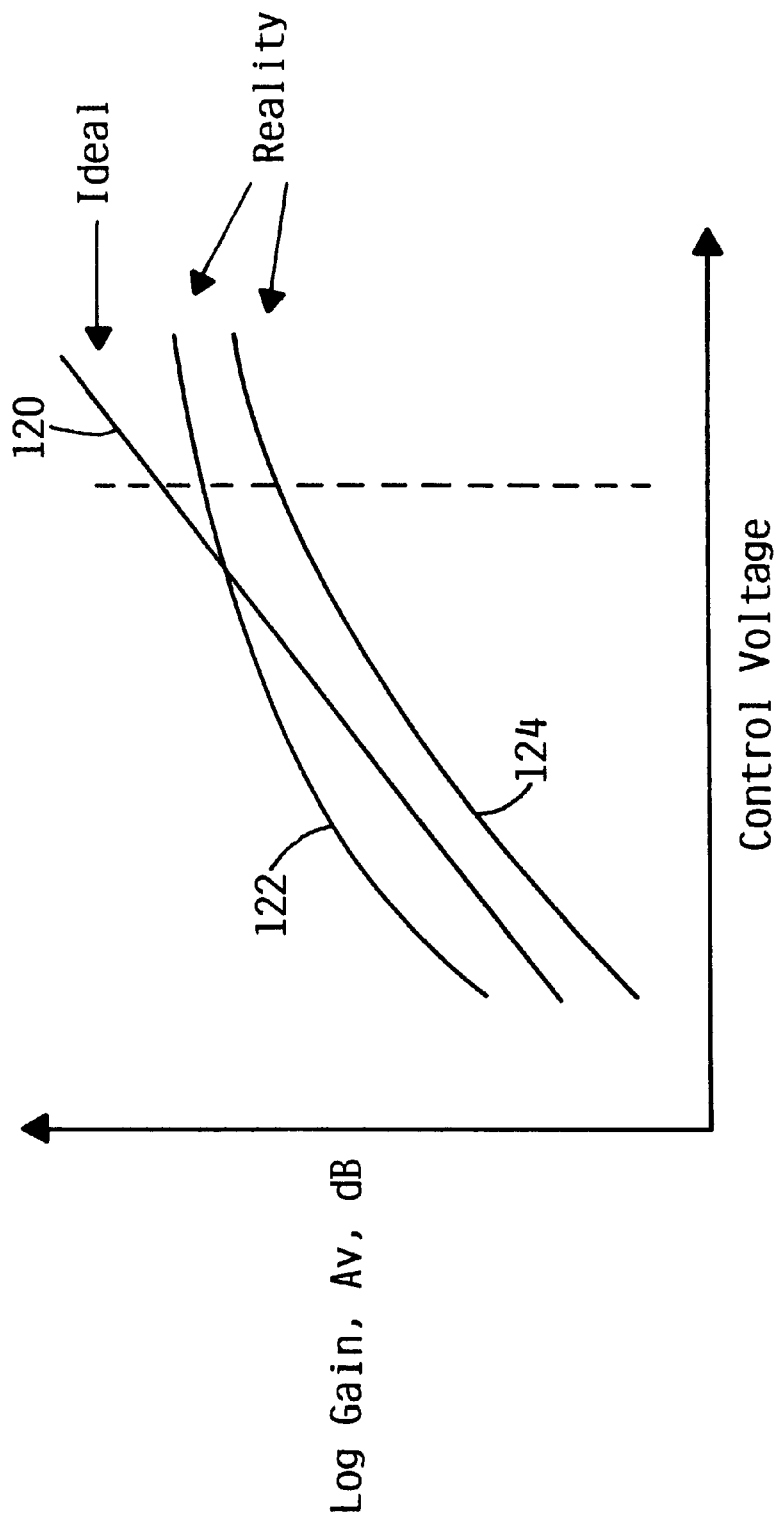
FIG. 5 is a plot of ideal and actual VGA gain curves as a function of control voltage plotted on a log scale.

Although measuring the relative readback signal amplitude is quite useful in a number of applications, it may be desirable to quantify with accuracy the absolute gain of VGA 76 or VGA 76/CTF 78 in combination. A significant problem associated with determining absolute VGA gain concerns the effects of temperature and process shifts which reduce the correlation between control voltage and absolute VGA gain. Ideally, the gain of VGA 76 would be a straight line, such as line 120 shown in FIG. 5, when plotted as a function of control voltage on a log scale graph (see FIG. 5). In reality, however, VGA gain varies as a function of control voltage, temperature, and process shifts, resulting in bowed lines 122, 124 when plotted on a log scale.

Temperature, for example, will vary in any given channel component depending on data rate, mode of operation, and the environment within which the particular system is operated. Thus, for a given channel component, the same voltage will produce a different gain as the temperature varies. Process shifts will affect the gain between different read channel modules. Thus, the same control voltage will result in different gain values between different read channel modules. The degree of bowing in the gain curve also adds another variable in the correlation between VGA gain and control voltage. All of these factors reduce the correlation between control voltage and absolute gain.

In order to use the control voltage to accurately predict absolute VGA gain, this gain relationship or gain curve must be characterized. At a minimum, the gain curve may be characterized at two different predetermined gain settings, such as a minimum and maximum gain setting. More preferably, VGA gain may be characterized at a number of different predetermined gain settings, such as eight predetermined gain settings, for example. Characterizing VGA gain at eight different predetermined gain settings allows one to generate a digital 8-bit word that represents a particular gain setting in the VGA. It is understood that VGA gain may be characterized at any number of different predetermined gain settings (i.e., N predetermined gain settings) which may be used to generate an appropriately sized digital word (i.e., N-bit digital word).

Figure 6:
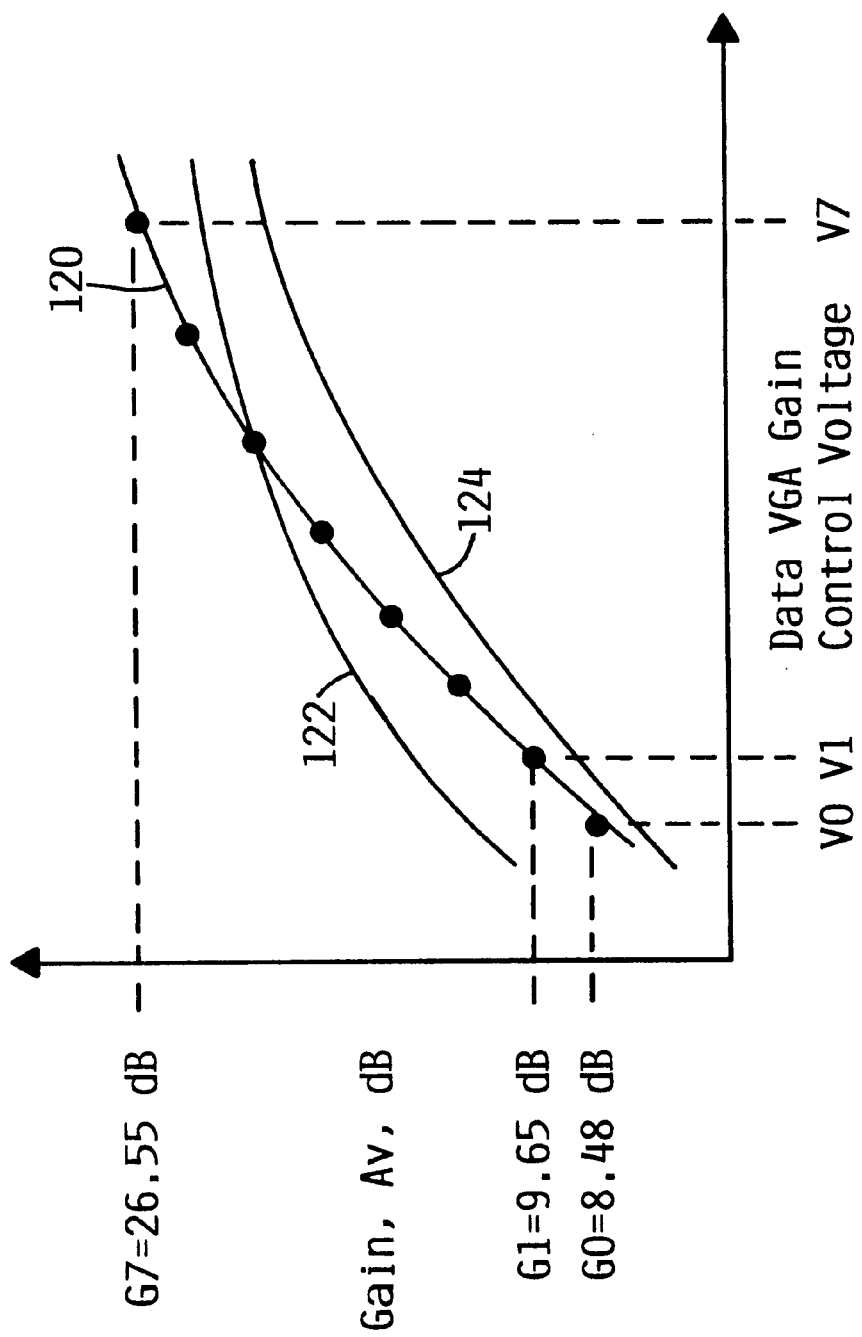
FIG. 6 illustrates the gain curve shown in FIG. 5 which has been characterized in accordance with the principles of the present invention.

With respect to the graph depicted in FIG. 6, the gain of a VGA is characterized at eight different gain values. The particular gain values to be characterized are typically selected by the designer depending on the particular read channel design. Having established eight predetermined VGA gain values developed for a given read channel design, a gain characterization routine may be initiated for purposes of determining a VGA control voltage for each of the predetermined VGA gain values.

As was previously mentioned, the VGA provides for normalization of the readback signal amplitude received from the AE module or other preamplifier. In an embodiment in which the normalized amplitude target is 800 mV$_{dpp}$ at the output of the VGA/CTF circuits, the absolute amplitude of the readback signal input to the VGA may be calculated by dividing 800 mV by the VGA gain as follows:

$$InputAmplitude = \frac{800 \, mV_{dpp}}{Gain\left(\frac{V}{V}\right)} = 800 \, mV_{dpp} \times 10^{-\left(\frac{Gain(dB)}{20}\right)} \quad [1]$$

where, Gain (dB) represents the absolute gain of the VGA or VGA/CTF circuitry computed after performing a gain characterization procedure in accordance with the principles of the present invention.

Figure 7A:
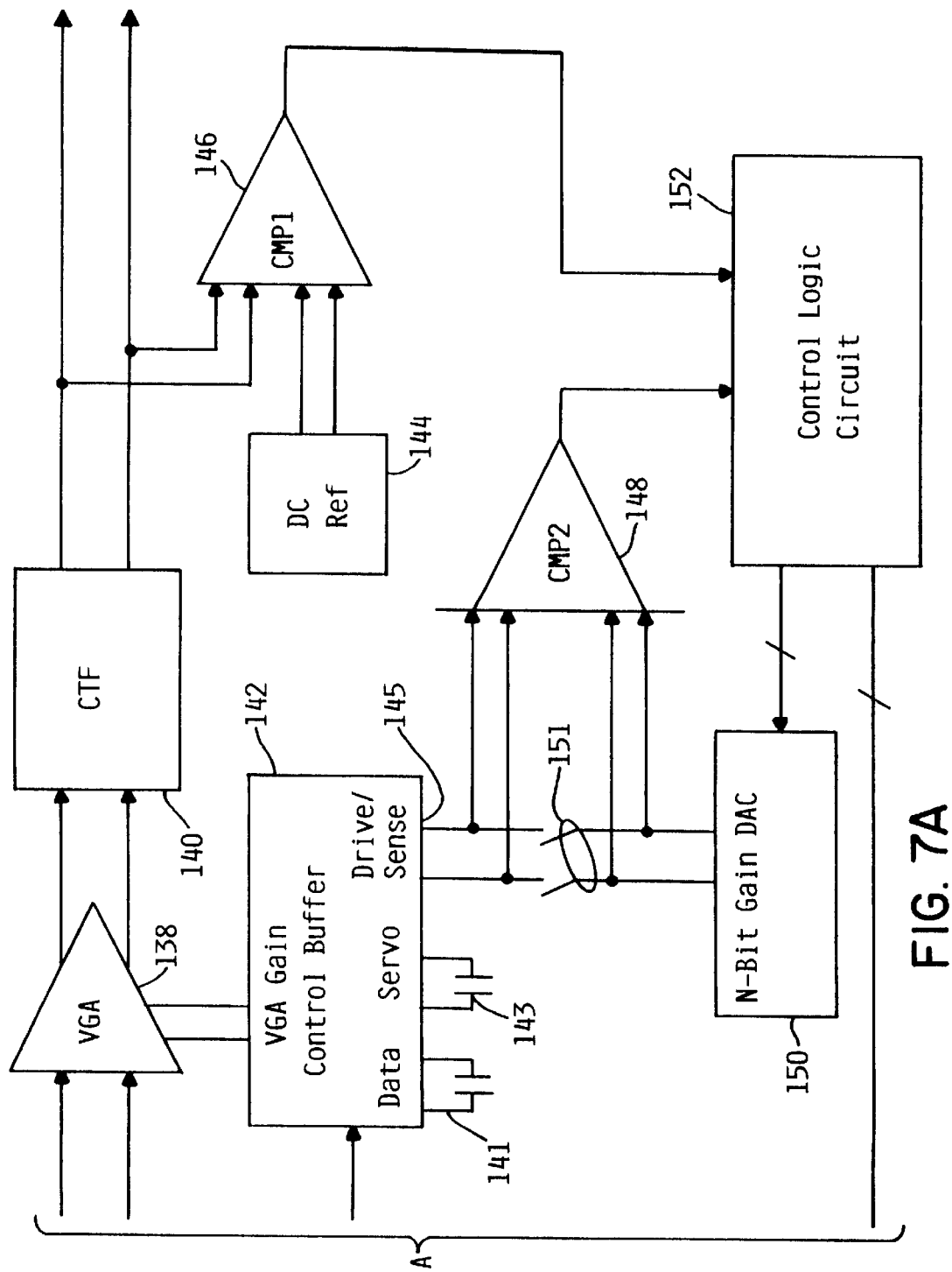
FIG. 7 is a system block diagram of a VGA gain characterization and absolute readback signal amplitude measuring circuit in accordance with an embodiment of the present invention.
Figure 7B:
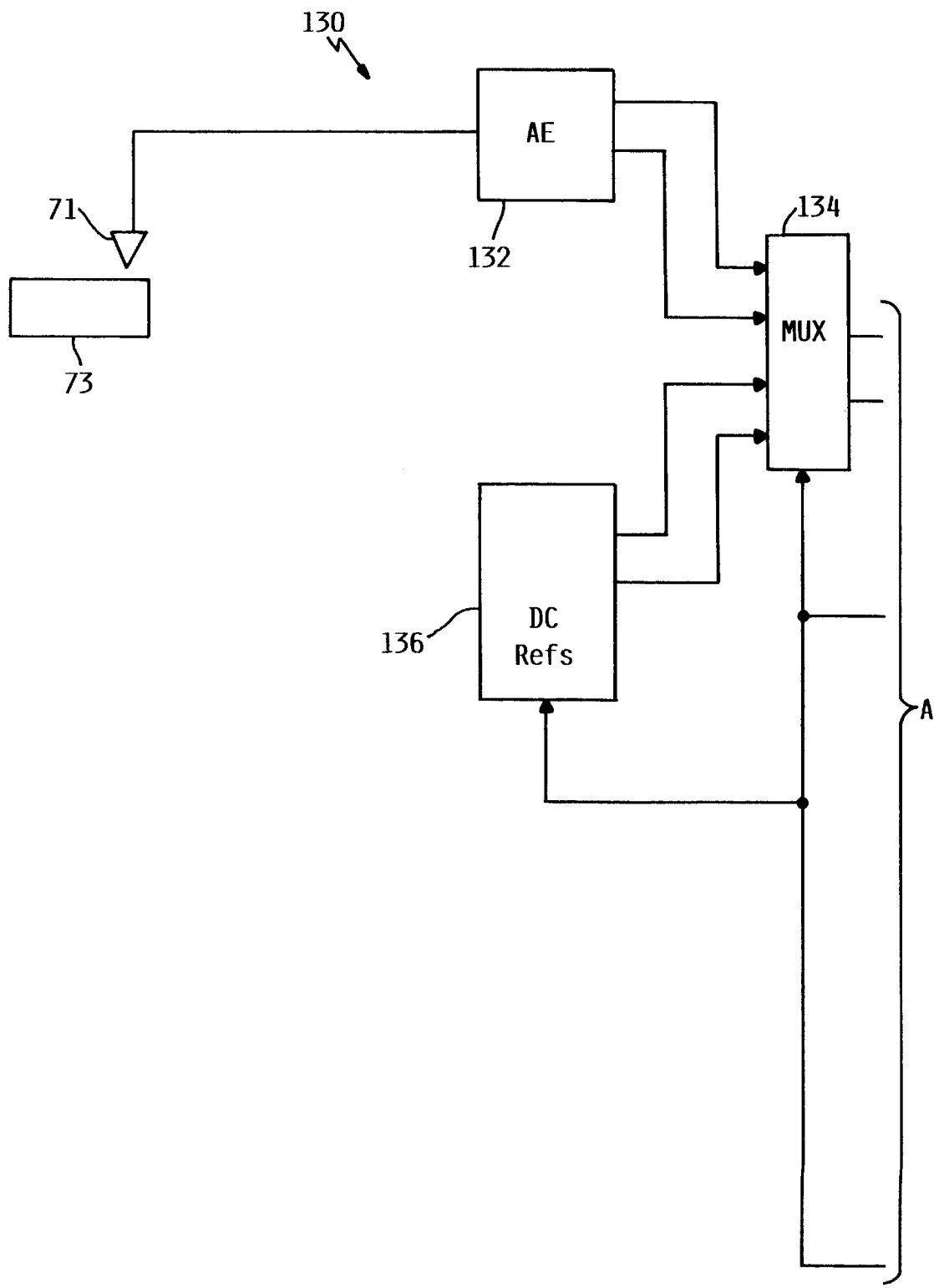

Referring now to FIG. 7, there is illustrated another embodiment of readback signal amplitude measurement circuitry which provides for both VGA gain characterization and measurement of the absolute amplitude of a readback signal received from an AE module or other preamplifier. In accordance with this embodiment, an AE module 132, which receives readback signals from a read transducer 71, is coupled to a multiplexer 134. Also coupled to the multiplexer 134 is a DC reference voltage source 136. The multiplexer 134 is coupled to VGA 138.

A comparator 146 has an input coupled to the output of CTF 140 and another input coupled to another DC reference voltage source 144. The comparator 146 is coupled to a control logic circuit 152. VGA 138 is coupled to a VGA gain control buffer 142. Gain control buffer 142 includes a drive/sense port 145 which is coupled to an input of comparator 148. It is understood that the components depicted as individual circuit elements in the Figures may alternatively be integrated within one or more multiple-purpose components. For example, the N-bit gain DAC 150 shown in FIGS. 7 and 8 may be integrated within the VGA gain control buffer 142.

An N-bit gain DAC 150 may be selectively coupled to either an input of comparator 148 or the drive/sense port 145 by switching of switch 151. In a configuration in which switch 151 couples the output of gain DAC 150 to drive/sense port 145 of gain control buffer 142, control voltages are forced into VGA 138 via the drive/sense port 145 during a gain characterization procedure.

The DC reference voltage source 136 produce s a number of different predetermined DC reference voltages for input to VGA 138 via multiplexer 134. The number of predetermined DC reference voltage settings preferably corresponds to the number of VGA gain values which are to be characterized. For example, and with reference to Table 2 below, each of the predetermined VGA gain values, $G_0$ through $G_7$, is associated with a corresponding effective VGA input voltage value.

TABLE 2

| Inputs Bits | | | Effective VGA Input | Predetermined VGA Gain | User Recorded 8-bit Control |
|---|---|---|---|---|---|
| Bit 2 | Bit 1 | Bit 0 | ($mV_{dpp}$) | Values (dB) | Voltage Words |
| 0 | 0 | 0 | 37.5 | $G_7$ = 26.55 | $V_7$ = ? |
| 0 | 0 | 1 | 75.0 | $G_6$ = 20.53 | $V_6$ = ? |
| 0 | 1 | 0 | 112.5 | $G_5$ = 17.00 | $V_5$ = ? |
| 0 | 1 | 1 | 150.0 | $G_4$ = 14.51 | $V_4$ = ? |
| 1 | 0 | 0 | 187.5 | $G_3$ = 12.57 | $V_3$ = ? |
| 1 | 0 | 1 | 225.0 | $G_2$ = 10.98 | $V_2$ = ? |
| 1 | 1 | 0 | 262.5 | $G_1$ = 9.65 | $V_1$ = ? |
| 1 | 1 | 1 | 300.0 | $G_0$ = 8.48 | $V_0$ = ? |

Referring to Table 2 above, the predetermined VGA gain value of $G_0$=8.48 dB, for example, has an associated effective VGA input voltage of 300.0 $mV_{dpp}$. The predetermined VGA gain value of $G_7$=26.55 dB, by way of further example, has an associated effective VGA input voltage of 37.5 $mV_{dpp}$. Given a read channel implementation in which readback signal amplitudes on the order of 30 to 300 $mV_{dpp}$ are expected at the output of AE module 132, the DC reference voltage source 136 may produce DC reference voltages within a range of approximately 15 mV to 150 mV.

Comparator 146 receives a reference voltage from DC reference voltage source 144 at a first input. The output of CTF 140 is coupled to another input of output comparator 146. For each DC reference voltage produced by DC reference voltage source 136 and applied to VGA 138 via multiplexer 134, the gain characterization procedure effects alteration of the VGA or VGA/CTF gain until the amplitude of the voltage signal at the output CTF 140 is equal to the DC reference voltage input to comparator 146. It is noted that the alternative embodiment depicted in FIG. 8 employs a multiplexer/switch circuit 154 to provide enhanced functionality and control. Use of the multiplexer/switch circuit 154 permits all comparison operations to be performed by a single comparator 156.

Figure 9A:
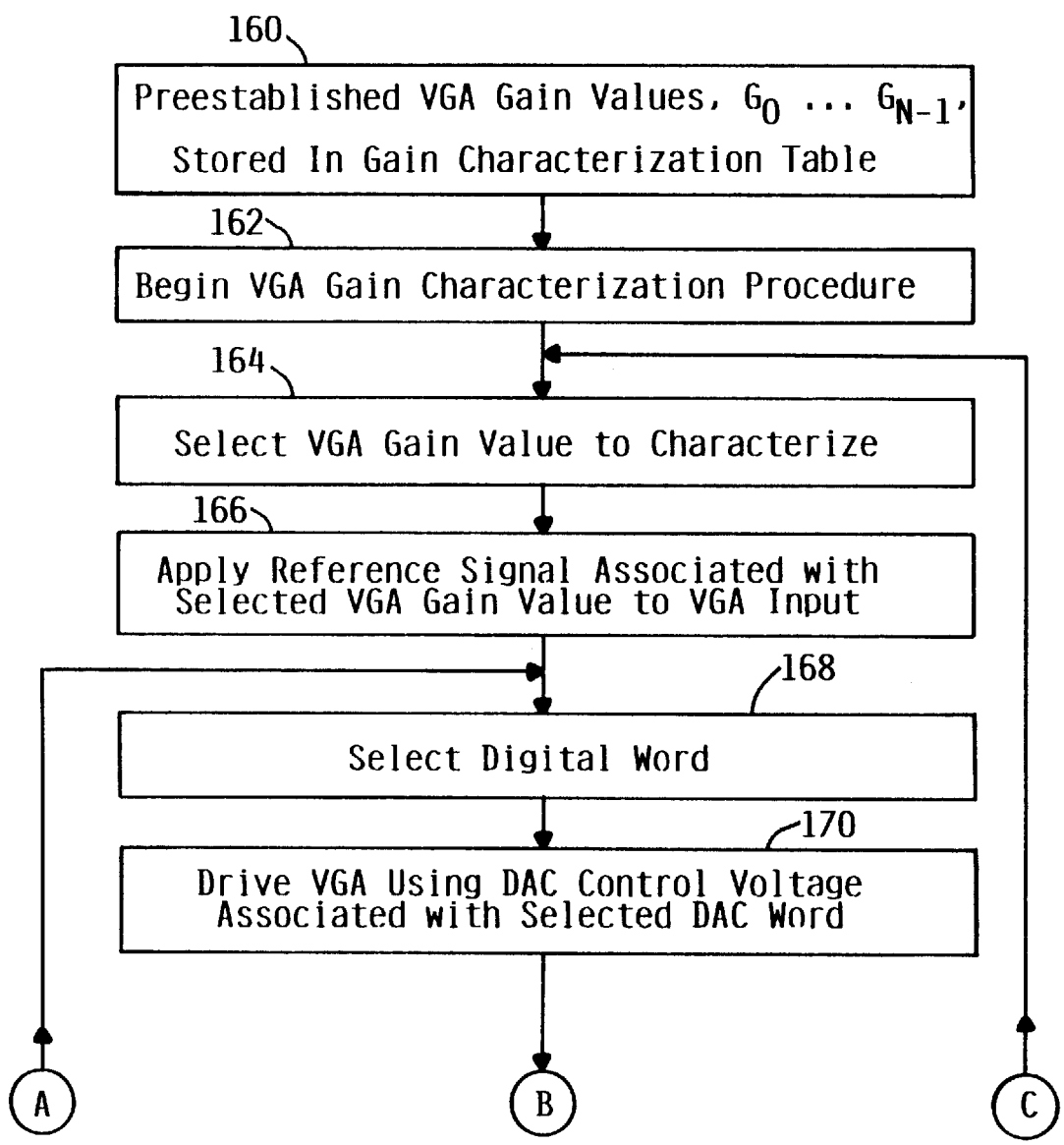
FIG. 9 illustrates in flow diagram form various process steps associated with a VGA gain characterization procedure in accordance with an embodiment of the present invention.
Figure 9B:
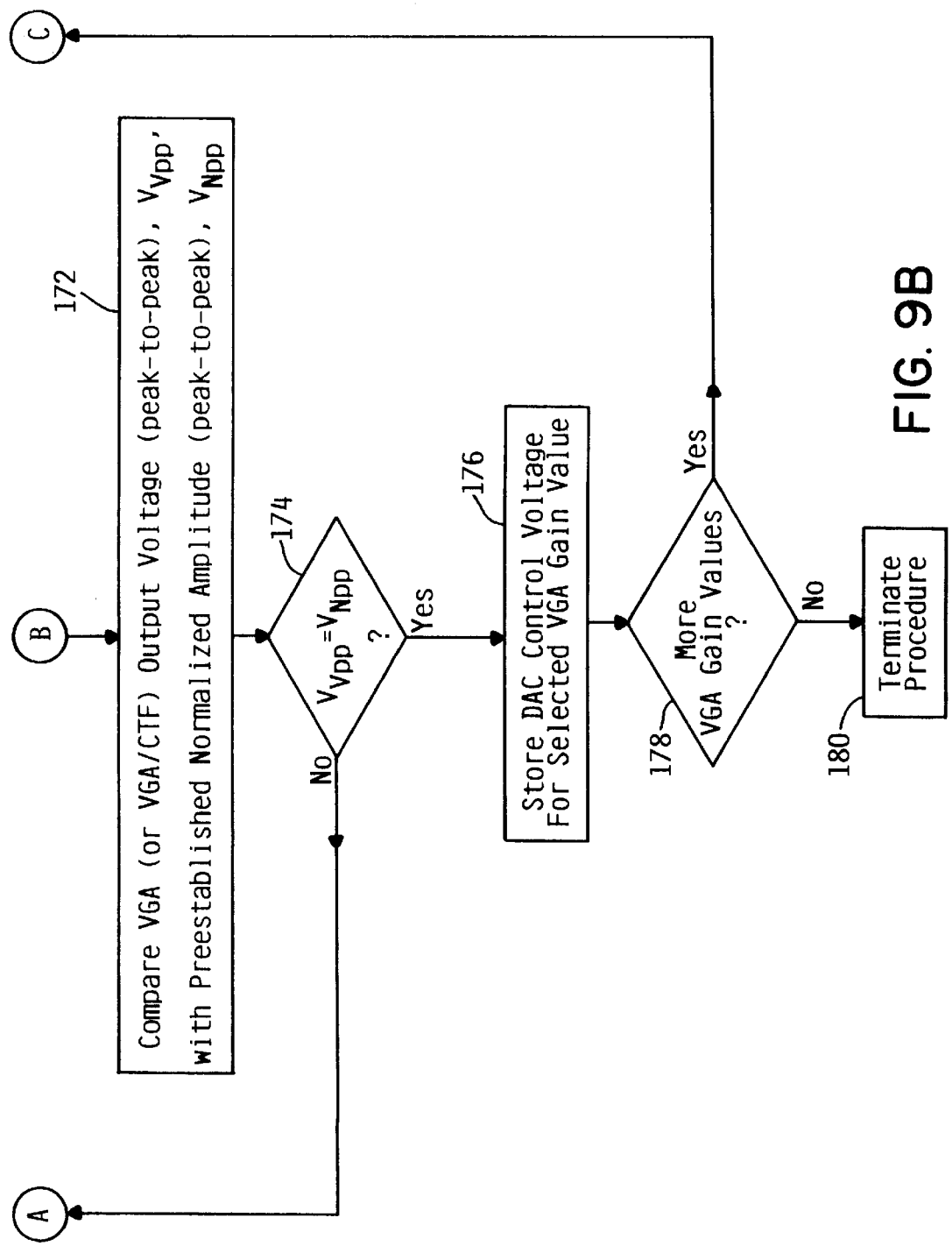
Figure 10A:
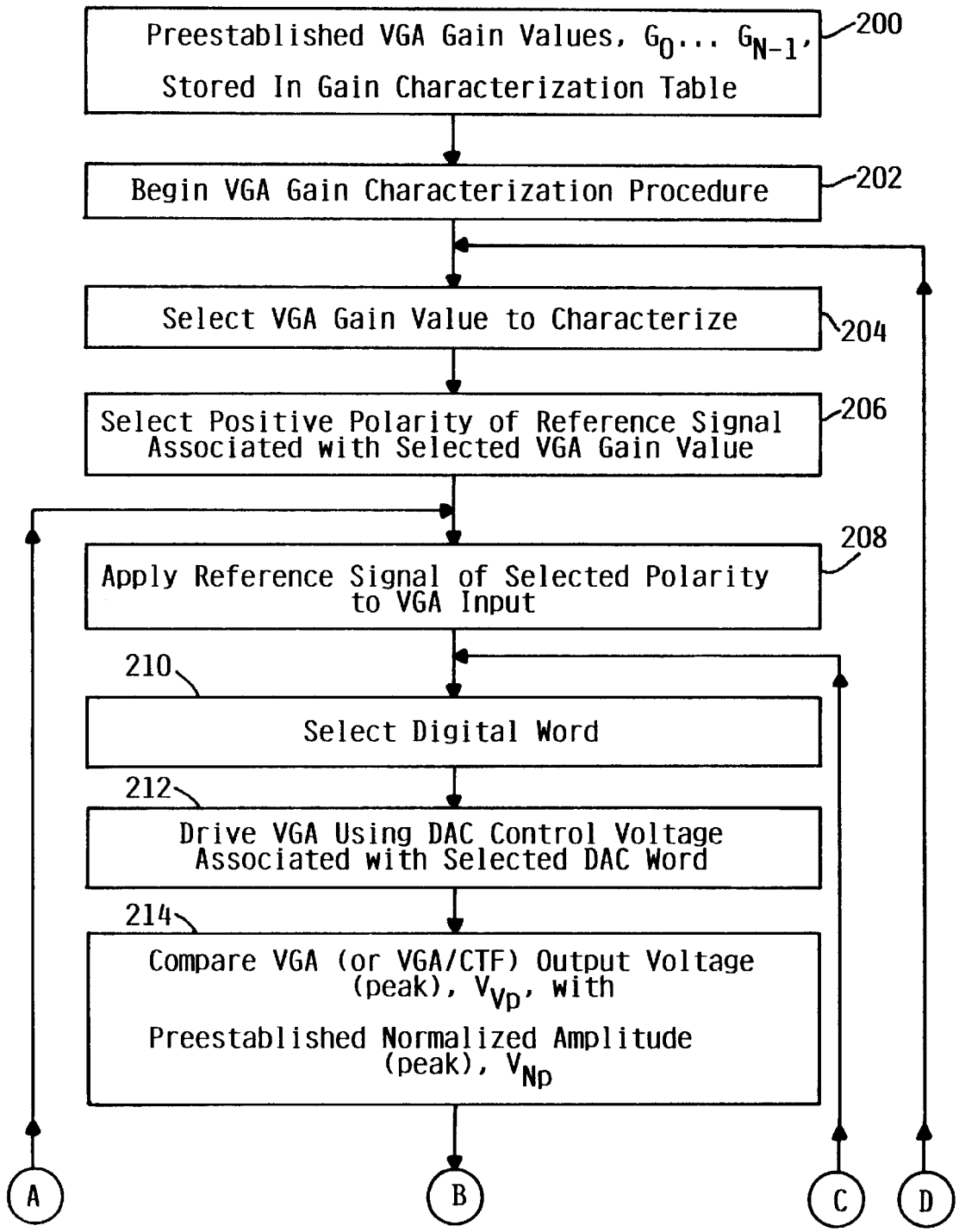
FIG. 10 illustrates various process steps associated with another embodiment of a VGA gain characterization procedure.
Figure 10B:
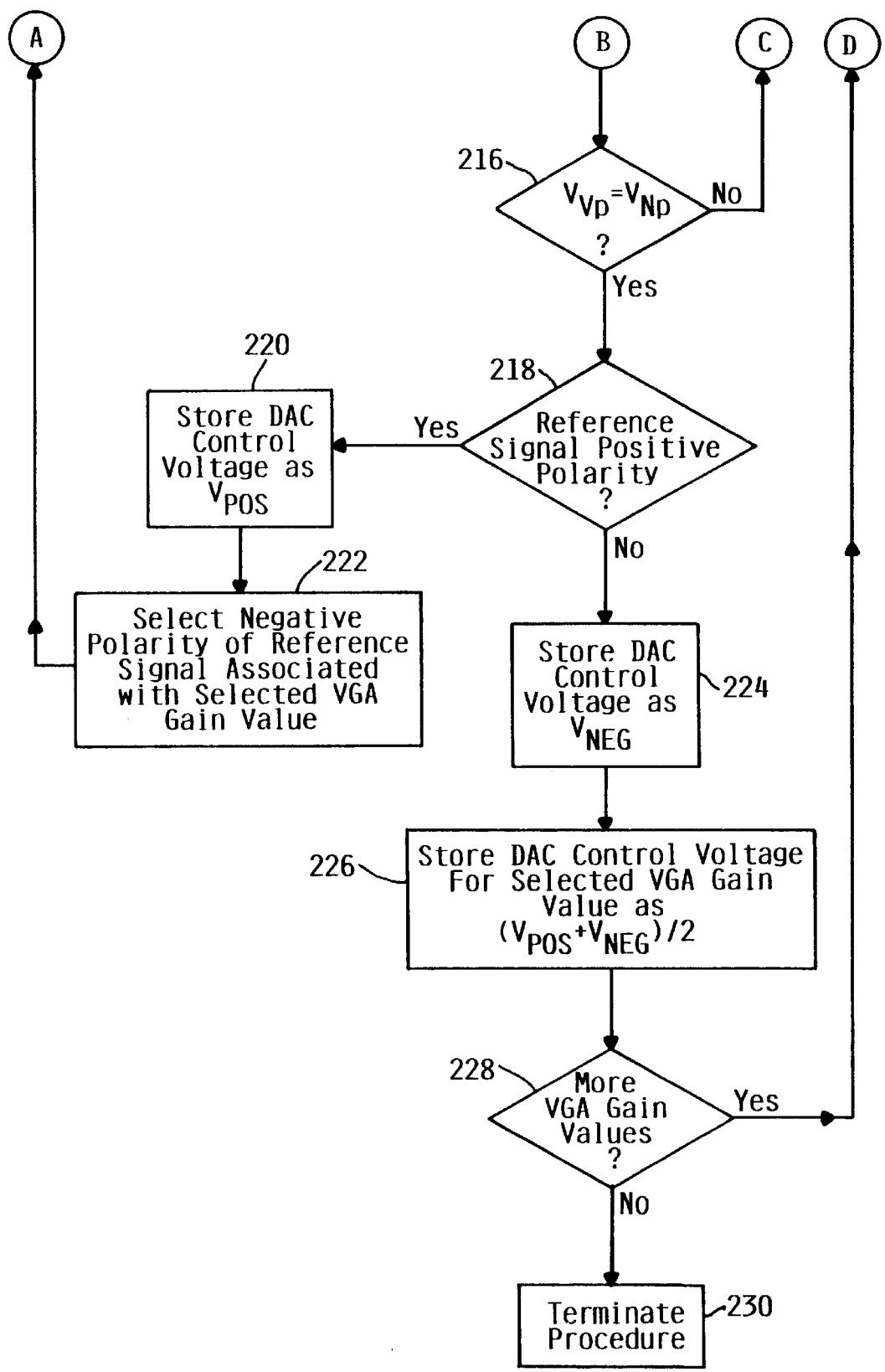
Figure 11:
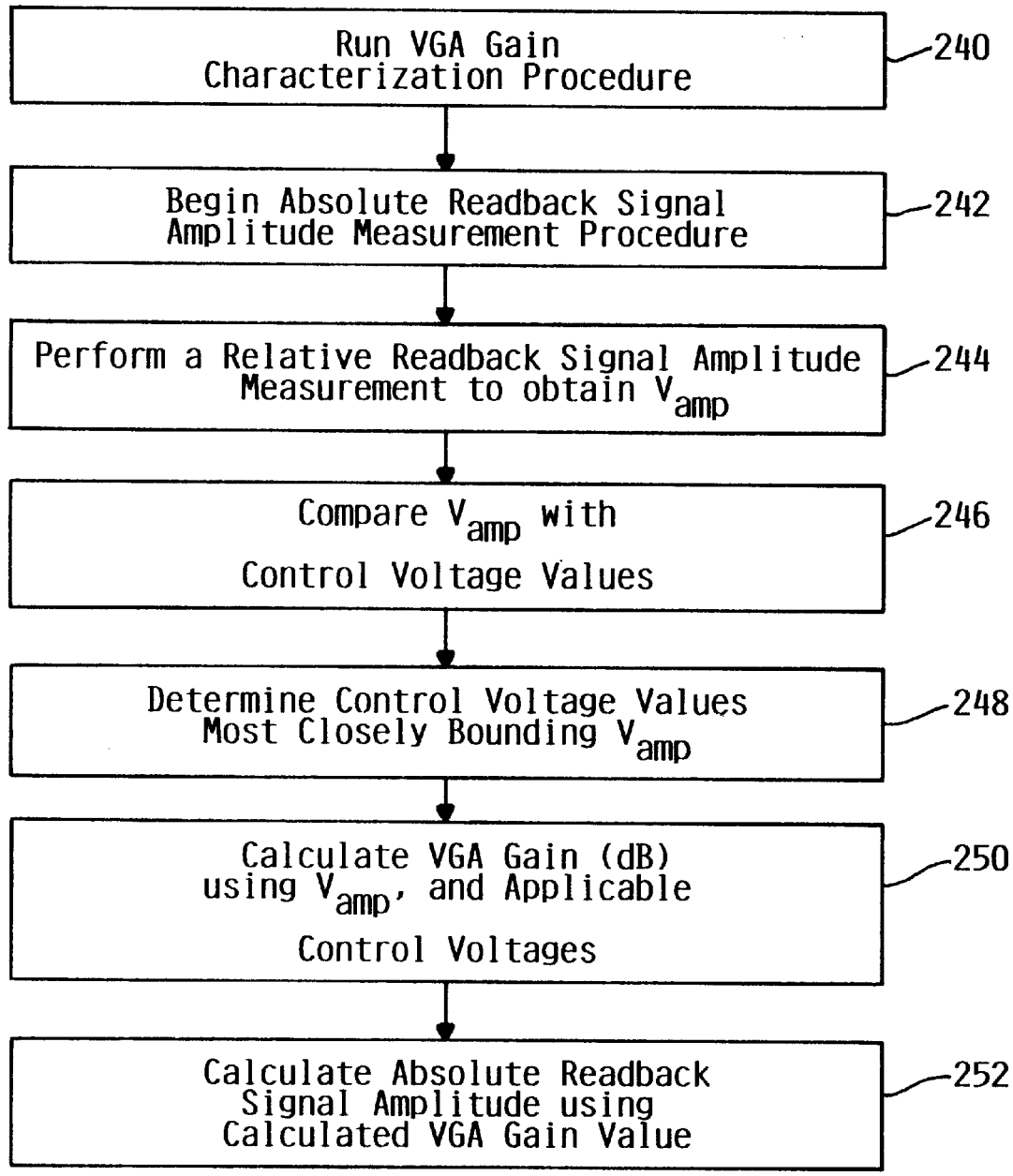
FIG. 11 illustrates various process steps associated with calculating an absolute readback signal amplitude subsequent to performing a VGA gain characterization procedure.

Additional details concerning a gain characterization procedure in accordance with the principles of the present invention are depicted in FIGS. 9–11. Concerning FIG. 9, a VGA gain characterization procedure is initiated 162 upon receiving a request, such as from a disk drive controller.

Figure 8A:
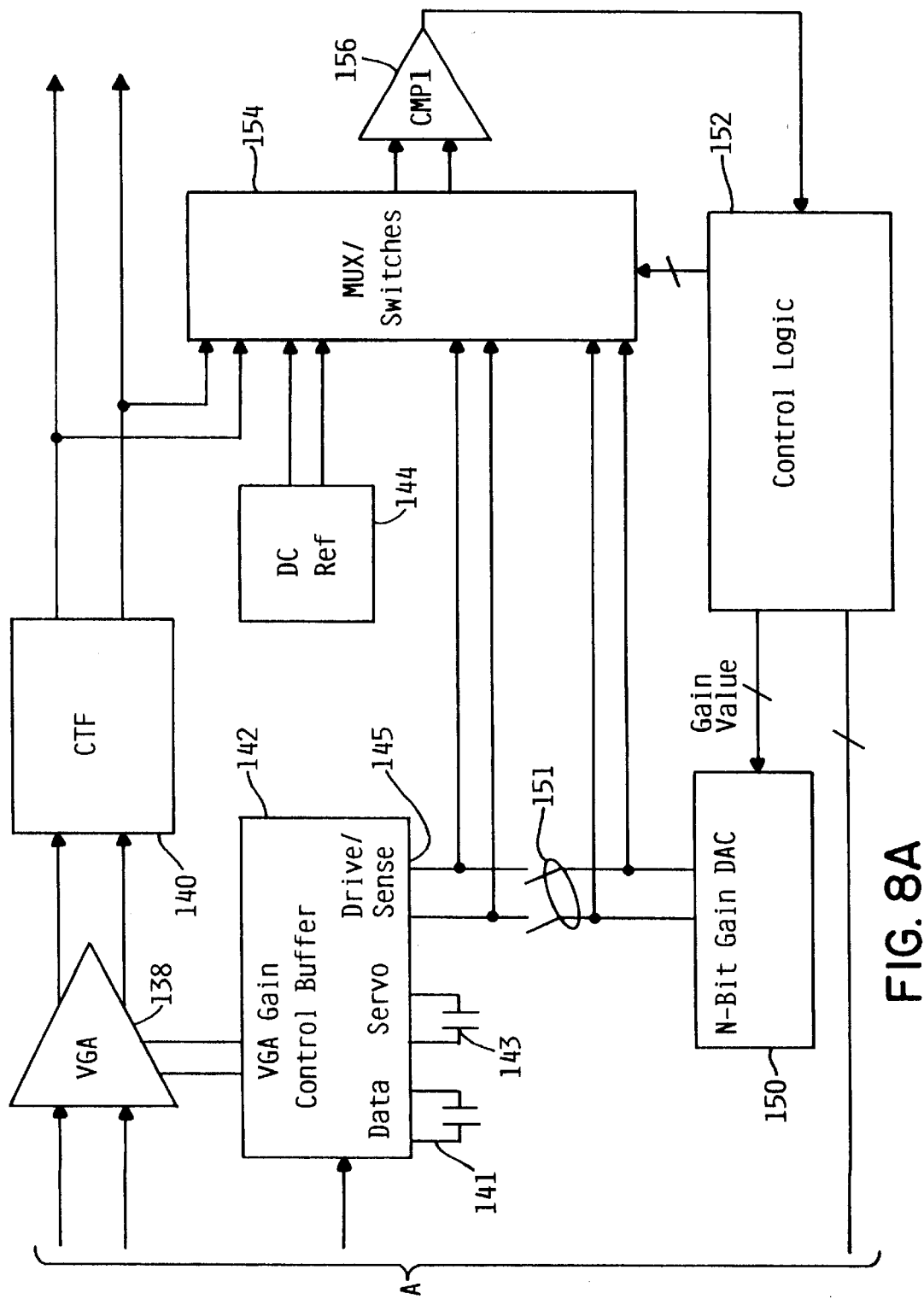
FIG. 8 is a block diagram of another embodiment of a VGA gain characterization and absolute readback signal amplitude measuring circuit.
Figure 8B:
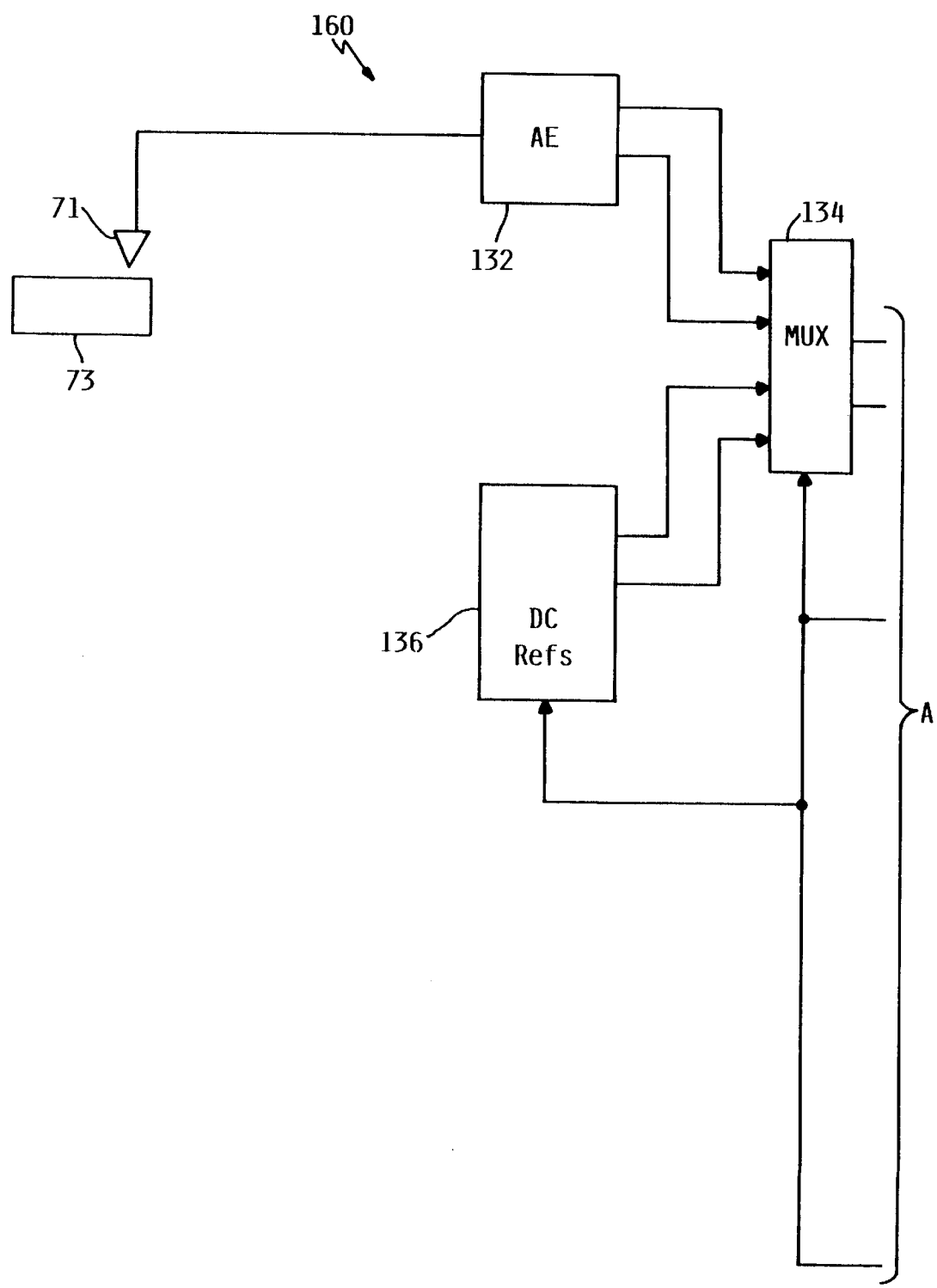

Initially, the control logic circuit 152, shown in FIGS. 7–8, or other logic/memory device stores 160 information similar to that depicted in Table 2 above, including predetermined VGA gain values, $G_0$–$G_{N-1}$. One of the VGA gain values is selected 164 for characterization. A DC reference voltage associated with the selected VGA gain value is input 166 to VGA 138.

A digital word (N-bit) is selected 168, and the control voltage associated with the selected digital word is transmitted 170 from the N-bit gain DAC 150 to the gain control buffer 142 via the drive/sense port 145 and closed switch 151. The voltage, $V_{Vpp}$, at the output of the VGA/CTF 138/140 is compared 172 with the pre-established normalized voltage amplitude, $V_{Npp}$, established by DC reference voltage source 144 input to comparator 146/156. If the voltage $V_{Vpp}$ is not equal 174 to the voltage $V_{Npp}$, another digital word is selected 168 and the associated control voltage is applied to the drive/sense port 145 of gain control buffer 142. Comparator 146/156 again compares 172 the voltages $V_{Vpp}$ and $V_{Npp}$.

The digital word selection 168 and comparison 172/174 operations continue until such time as the voltage $V_{Vpp}$ is equivalent to the voltage $V_{Npp}$, at which time the most recently used (i.e., the last used) DAC control voltage is stored 176 as that corresponding with the selected VGA gain value. If additional VGA gain values are to be characterized 178, the gain characterization steps 164–176 depicted in FIG. 9 are repeated until such time as the gain characterization procedure is terminated 180.

FIG. 10 depicts an alternative embodiment of a VGA gain characterization routine which nullifies the effects of DC offsets associated with the VGA 138 and CTF 140 components. Since DC reference voltages are used to characterize the VGA/CTF loop gain in accordance with the present embodiment, DC offsets associated with the VGA and CTF circuit elements 138, 140 may be of concern. If the VGA/CTF components 138, 140 have an offset of, for example, +/−100 mV at the CTF output, a large error may occur when characterizing VGA gains on the order of 400 $mV_{pp}$ DC at the output of CTF 140. This DC offset may be effectively nullified by performing two VGA gain characterization routines using opposite polarities of each DC reference voltage applied to VGA 138. An average of the two resulting DAC control voltages may be used as that associated with a given VGA gain value.

In accordance with this embodiment, and assuming that the VGA gain characterization procedure is initiated 202 for a number of predetermined VGA gain values 200, one of the VGA gain values is selected 204 for characterization. The positive polarity of the reference voltage signal associated with the selected VGA gain value 206 is selected and applied 208 to the input of VGA 138. A digital word 210 is initially selected by control logic circuit 152, and the control voltage associated with the selected digital word is transmitted from the N-bit gain DAC 150 to the drive/sense port 145 of the gain control buffer 142.

Comparator 146/156 compares the peak voltage, $V_{Vp}$, at the output of CTF 140 with the pre-established normalized peak amplitude, $V_{Np}$, established by DC reference voltage source 144. If the voltages $V_{Vp}$ and $V_{Np}$ are unequal 216, another digital word is selected 210 and the associated control voltage is applied 212 to VGA control buffer 142. If the voltages $V_{Vp}$ and $V_{Np}$ are equivalent 216, the associated DAC control voltage is stored 220 as a voltage value of $V_{pos}$.

The negative polarity of the selected 222 reference signal associated with the selected VGA gain value is applied 208 to the input of VGA 138. A digital word is selected 210 by control logic circuit 152 and the corresponding control voltage is applied 212 to the drive/sense port 145 of gain control buffer 142. Comparator 146/156 compares the peak voltage, $V_{Vp}$, at the output of CTF 140 with the pre-established normalized peak amplitude, $V_{Np}$. If not equivalent 216, steps 210–214 are repeated. If equivalent 216, the applicable control voltage is stored 224 as a voltage value of $V_{neg}$.

After determining DAC control voltage values associated with the positive and negative polarities of the reference signal associated with the selected VGA gain value, an average control voltage values (i.e., $(V_{pos}+V_{neg})/2$) is computed and stored 226 as the applicable control voltage associated with the selected VGA gain value. Table 3 below illustrates various data that may be stored for purposes of implementing the instant embodiment of the present invention.

TABLE 3

| Predetermined VGA Gain Values (dB) | Characterization Results | | Averaged Characterization Results |
|---|---|---|---|
| | Negative Signal | Positive Signal | |
| $G_7 = 26.55$ | $V_{7neg}$ | $V_{7pos}$ | $V_{7avg}$ |
| $G_6 = 20.53$ | $V_{6neg}$ | $V_{6pos}$ | $V_{6avg}$ |
| $G_5 = 17.00$ | $V_{5neg}$ | $V_{5pos}$ | $V_{5avg}$ |
| $G_4 = 14.51$ | $V_{4neg}$ | $V_{4pos}$ | $V_{4avg}$ |
| $G_3 = 12.57$ | $V_{3neg}$ | $V_{3pos}$ | $V_{3avg}$ |
| $G_2 = 10.98$ | $V_{2neg}$ | $V_{2pos}$ | $V_{2avg}$ |
| $G_1 = 9.65$ | $V_{1neg}$ | $V_{1pos}$ | $V_{1avg}$ |
| $G_0 = 8.48$ | $V_{0neg}$ | $V_{0pos}$ | $V_{0avg}$ |

Gain characterization steps 204 through 226 are repeated for each additional VGA gain value of interest until termination of the gain characterization procedure 230. Having characterized the VGA loop gain at a minimum of two pre-established gain curve values, and preferably at greater than two gain values, an absolute readback signal amplitude measurement procedure may be initiated 242, as is depicted in FIG. 11.

FIG. 11 illustrates various process steps associated with performing an absolute readback signal amplitude measurement subsequent to performing a VGA gain characterization procedure 240. An absolute readback signal amplitude measurement is initiated 242 typically in response to an amplitude measurement request. A relative readback signal amplitude measurement is performed 244 in accordance with the approaches previously described with respect to FIG. 4 in order to obtain the value of the sense voltage, $V_{amp}$, across the drive/sense port 145.

When taking an amplitude measurement 244, switch 151, shown in FIGS. 7–8, is transitioned from a closed state, which is required during VGA gain characterization, to an open state. The voltage across either one of the data or servo gain capacitors 141, 143 is developed at the drive/sense port 145 as described previously. The value of $V_{amp}$ is stored and compared 246 with the control voltage values established during VGA gain characterization. Control logic circuit 152 determines 248 the control voltage values that most closely bound the voltage $V_{amp}$.

For example, and with reference to Table 3 above, control logic circuit 152 may determine that the voltage $V_{amp}$ is most closely bounded by control voltage values $V_{4avg}$ and $V_{3avg}$. The VGA loop gain, measured in dB, may then be calculated 250 using the value of $V_{amp}$ and the applicable control voltage values as follows:

$$Gain(dB) = \left(\frac{G_4 - G_3}{V_{4avg} - V_{3avg}}\right)(V_{amp} - V_{3avg}) + G_3 \quad [2]$$

In equation [2] above, it is assumed that the value of the voltage $V_{amp}$ lies between control voltage values $V_{3avg}$ and $V_{4avg}$. It is noted that Equation [2] above represents a linear (i.e., y=mx+b) approximation equation that is applied to the VGA gain curve when plotted as dB gain versus control voltage (i.e., 8-bit word=$V_{amp}$). It is understood that the gain equation provided as Equation [2] above represents one of many possible approximation approaches, and that other curve fitting techniques may be used, such as the use of a polynomial or non-linear approximation method.

The value of the Gain, in dB, calculated using Equation [2] above may then be used to compute 252 the absolute readback signal amplitude as follows:

$$V_{input} = 800\,mV \times 10^{-\left(\frac{Gain(dB)}{20}\right)} \quad [3]$$

where, 800 mV represents the pre-established normalized amplitude maintained by the VGA 138 at the output of the VGA 138 or VGA/CTF 138,140, and the value of $V_{input}$ represents the absolute amplitude of the readback signal communicated from the AE module 132 (i.e., pre-amplifier) to VGA 138.

It is noted that in order to use equations [2] and [3] above to determine absolute readback signal amplitude, at least two VGA gain values must be characterized. It is understood that characterizing more than the minimum of two points on a VGA gain curve increases the accuracy of the absolute readback signal amplitude measurement. Once the VGA gain characterization procedure has been completed, any number of absolute amplitude measurements and computations may be performed.

The foregoing description of the various embodiments of the invention has been presented for the purposes of illustration and description. It is not intended to be exhaustive or to limit the invention to the precise form disclosed. For example, AC reference voltage signals may be used instead of DC reference voltage signals in connection with characterizing the gain of the VGA AGC loop. Many modifications and variations are possible in light of the above teaching. It is intended that the scope of the invention be limited not by this detailed description, but rather by the claims appended hereto.

What is claimed is:

1. A method of measuring in-situ a read channel an amplitude of a readback signal obtained from a data storage medium and input to a gain modifying amplifier, the method comprising:

sensing a voltage signal associated with a gain of the amplifier;

selecting a digital word value representative of a control voltage signal;

comparing the sensed voltage signal with the control voltage signal; and repeating the selecting and comparing steps until selection of a particular digital word value provides for the sensed voltage signal being equal to the control voltage signal, wherein the particular digital word value represents a relative amplitude of the readback signal.

2. The method according to claim 1, further comprising reading out the particular digital word value or the relative amplitude of the readback signal.

3. The method according to claim 1, wherein selecting the digital word value further comprises selecting the digital word value using a successive approximation method.

4. The method according to claim 1, wherein the sensing step is performed when the read channel is in a read mode of operation.

5. The method according to claim 1, wherein the measuring method is initiated in response to an amplitude measurement request.

6. The method according to claim 1, wherein sensing the voltage signal associated with the gain of the amplifier further comprises sensing an automatic gain control (AGC) loop voltage signal.

7. The method according to claim 1, wherein sensing the voltage signal associated with the gain of the amplifier further comprises sensing an integrated AGC loop voltage signal.

8. The method according to claim 1, further comprising determining gain characteristics of the amplifier prior to sensing the voltage signal associated with the gain of the amplifier, wherein the particular digital word value represents an absolute amplitude of the readback signal.

9. The method according to claim 8, wherein determining the gain characteristics of the amplifier comprises:

applying each of a plurality of reference voltage signals to a signal input of the amplifier, each of the plurality of reference voltage signals associated with a corresponding one of a plurality of pre-established gain values; and for each of the plurality of reference voltage signals applied to the signal input of the amplifier, selectively applying control voltage signals to the amplifier until an output voltage signal produced by the amplifier is equal to a pre-established reference voltage signal.

10. The method according to claim 1, wherein the sensing step is performed when the read channel is in an idle mode of operation.

11. The method according to claim 1, wherein the sensing step is performed when the read channel is in a servo mode of operation.

12. A method of measuring in-situ a read channel an amplitude of a readback signal obtained from a data storage medium and input to a gain modifying amplifier, the method comprising:

characterizing a gain characteristic of the amplifier;

sensing, after characterizing the gain characteristic, a voltage signal associated with a gain of the amplifier;

selecting a digital word value representative of a control voltage signal;

comparing the sensed voltage signal with the control voltage signal; and repeating the selecting and comparing steps until selection of a particular digital word value provides for the sensed voltage signal being equal to the control voltage signal, wherein the particular digital word value represents an absolute amplitude of the readback signal.

13. The method according to claim 12, wherein characterizing the gain characteristic of the amplifier comprises:

applying each of a plurality of reference voltage signals to a signal input of the amplifier, each of the plurality of reference voltage signals associated with a corresponding one of a plurality of pre-established gain values; and for each of the plurality of reference voltage signals applied to the signal input of the amplifier, selectively applying control voltage signals to the amplifier until an output voltage signal produced by the amplifier is substantially equal to a pre-established reference voltage signal.

14. The method according to claim 12, further comprising reading out the particular digital word value or the absolute amplitude of the readback signal.

15. The method according to claim 12, wherein selecting the digital word value further comprises selecting the digital word value using a successive approximation method.

16. The method according to claim 12, wherein the sensing step is performed when the read channel is in a read mode or an idle mode of operation.

17. The method according to claim 12, wherein the sensing step is performed when the read channel is in a servo mode of operation.

18. The method according to claim 12, wherein the measuring method is initiated in response to an amplitude measurement request.

19. The method according to claim 12, wherein sensing the voltage signal associated with the gain of the amplifier further comprises sensing an automatic gain control (AGC) loop voltage signal.

20. The method according to claim 12, wherein sensing the voltage signal associated with the gain of the amplifier further comprises sensing an integrated AGC loop voltage signal.

* * * * *